Dec. 12, 1933.  R. I. McLELLAN  1,939,015
HOTHOUSE
Filed Jan. 29, 1932   2 Sheets-Sheet 1
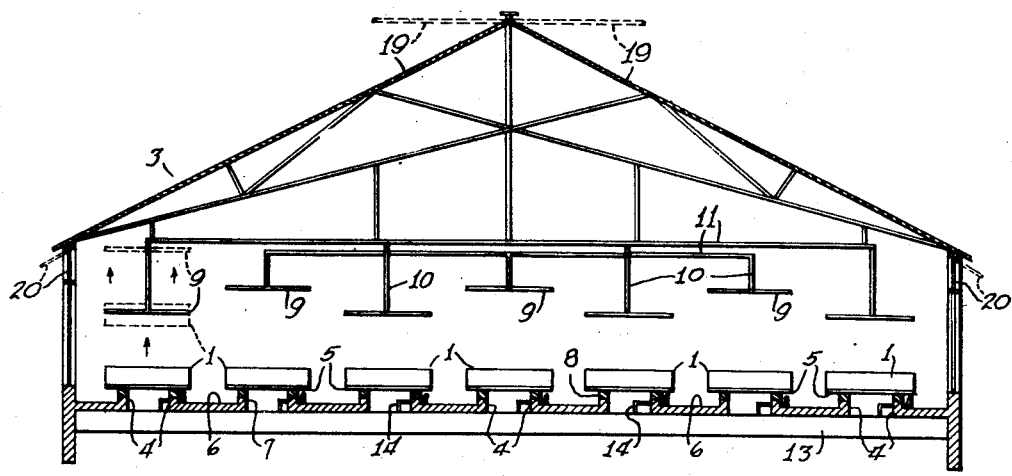
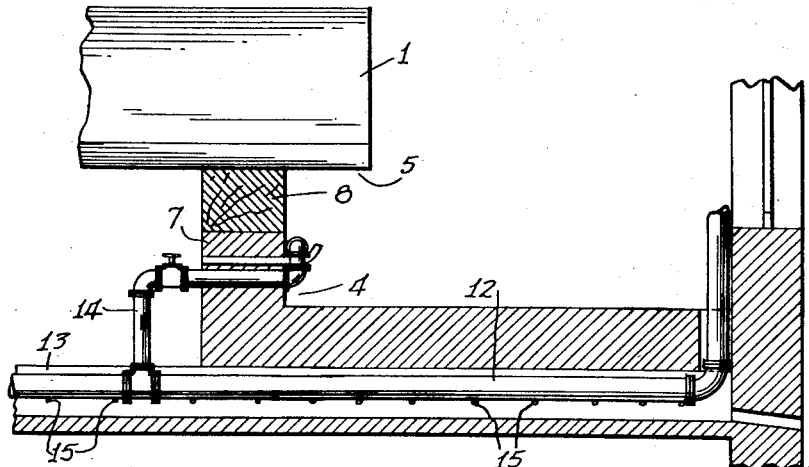
INVENTOR.
RODERICK I. McLELLAN
BY
ATTORNEYS.

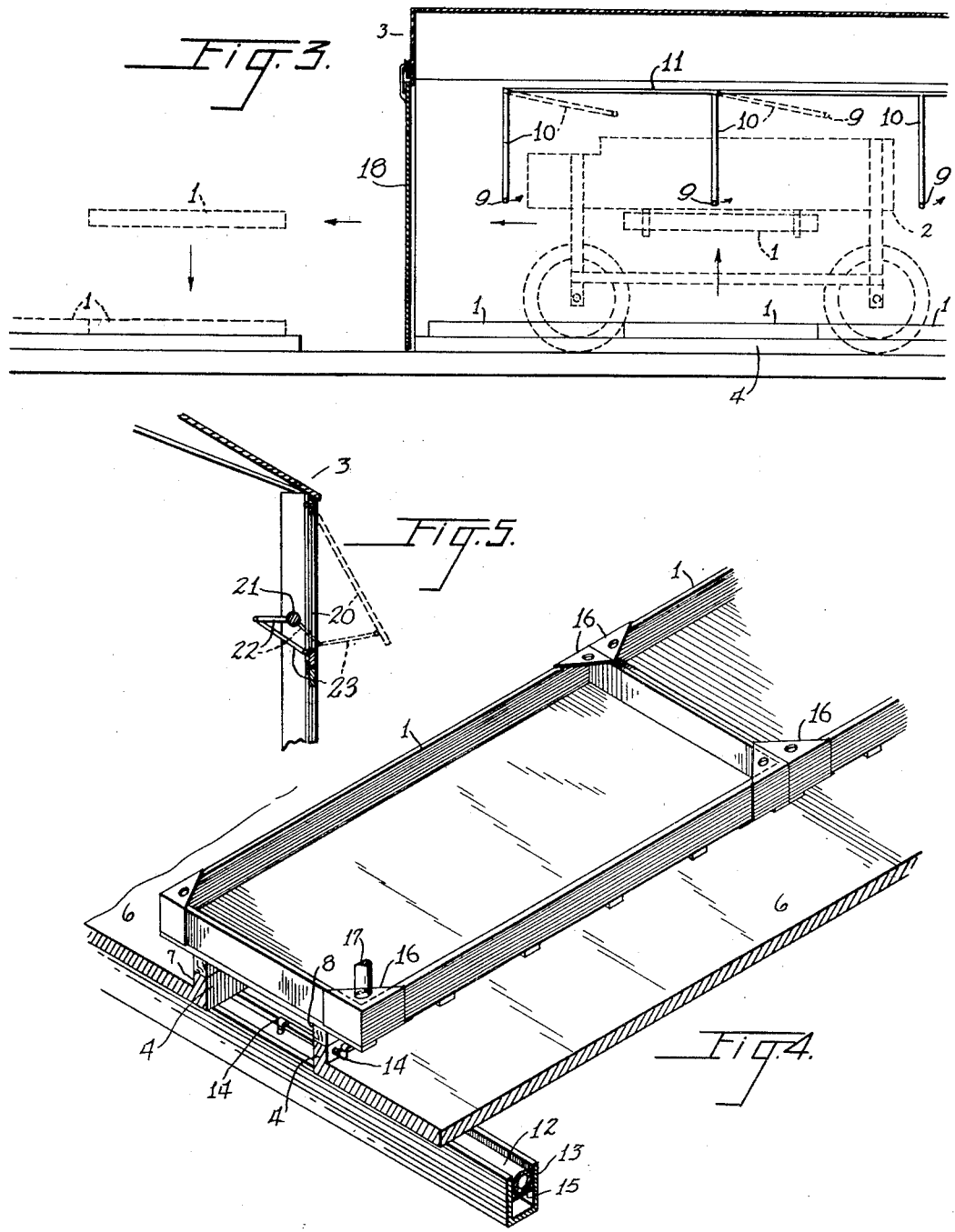

Patented Dec. 12, 1933

1,939,015

UNITED STATES PATENT OFFICE

1,939,015

HOTHOUSE

Roderick I. McLellan, Burlingame, Calif.

Application January 29, 1932. Serial No. 589,693

8 Claims. (Cl. 47—17)

The present invention relates to improvements in hot houses and in handling flowers, plants and vegetables, and more particularly that kind of flowers, plants and vegetables known as forced under glass stock.

The principal object of the invention is to provide a method of handling cut flowers in hot houses more economically than they are handled under present methods, and particularly to save time and space and to allow the capacity of a hot house to be increased to a great extent through greater production.

It is considered necessary in many localities that cut flowers during the cutting period extending over a number of months be kept in the hot house, while the climate is sufficiently favorable to allow the growing period to take place outdoors. During the cutting period the flowers are arranged in long benches, each bench accommodating a large number of flowers and the flowers being arranged in the benches in evenly spaced relation. As a rule there is some kind of support for each individual plant necessary, in some cases netting of wire and string, in others a series of stakes to which the plants are tied. The benches are usually hundreds of yards in length and are arranged in spaced relation so as to leave walks between the same, allowing the attendant to cut the flowers from either side.

These benches are secured in place permanently, and on account of their great length cannot be moved. Since it is injurious to the plants or flowers to transplant the same at the end of the growing period or at the beginning of the cutting period, it is necessary in an arrangement of this character to plant the flowers in their permanent places in the benches at an early period in the life of the flower so that the entire growing period takes place in the benches in the hot houses. This method seriously reduces the capacity of the hot house since the latter has to accommodate a large number of flowers which are not ready for cutting and which might as well be growing outdoors. Also with pot plants and vegetables it is often very advantageous to grow the young stock out of doors, not only for obtaining the size but to obtain a large, more sturdy plant, whether in pots or planted directly in the bed. As these plants mature and the forcing period approaches the plants of any size can be moved in the glass house, without disturbing the fruit, flower or bush in any way. While this growth is taking place on the outside, similar growth is taking place on the inside from the previous lot or crop, thereby saving the costly space under glass.

It is the principal object of the present invention to provide a method by which the plants or flowers may be easily removed, without disturbing the same, from outdoors into the hot house at the end of the growing period, or at the beginning of the cutting period so that the hot house itself needs to accommodate only those flowers which are actually ready for cutting, whereby the capacity of the hot house is considerably increased and in fact may be easily doubled.

Further objects and advantages of my invention will appear as the specification proceeds.

The preferred form of my invention is illustrated in the accompanying drawings, in which Figure 1 shows a vertical cross section through a hot house arranged in accordance with my method;

Figure 2 an enlarged vertical section through a small portion of the hot house adjacent one of the walls thereof to explain certain details of my invention;

Figure 3 a fragmentary section through a portion of the hot house adjacent the entrance doors;

Figure 4 a perspective view illustrating one of my boxes and the means in the hot house for accommodating the same; and Figure 5 a section through a portion of the hot house showing the ventilating system.

While I have shown only the preferred form of my invention, it should be understood that various changes or modifications may be made within the scope of the claims hereto attached without departing from the spirit of the invention. Particularly it should be understood that while in the following description, and in the claims, I refer to the growing of flowers principally, this expression is meant to cover any other growth such as fruits, vegetables, and plants adapted to be grown or forced in hot houses.

The principal idea of my invention is to divide the long stationary benches previously employed into a plurality of individual boxes which are removably arranged in the hot house in such a manner that each of the boxes is adapted for placing and removal by means of a suitable vehicle.

These boxes identified by the numeral 1 may be used either outdoors or indoors, and when the small plants grown from seeds or cuttings are ready for transplanting they are first placed in these boxes, while the latter are outdoors. They are planted in their permanent place, that is in sufficiently spaced relation so that they may be accommodated in the same box after they have attained their maximum growth. The boxes may be arranged outdoors in any suitable manner, but so as to be accessible for vehicles used for lifting and conveying the boxes.

In this connection I might state that for moving the boxes, I preferably use a truck or vehicle now on the market and principally employed in conveying lumber. One of these trucks is indicated at 2, and its principal feature is that it straddles the load to be lifted and is provided with suitable jaws adapted to be clamped upon the sides and bottom edges of the load, the jaws being arranged so that they can be raised and lowered for raising the load to a suitable height above its supporting means before the vehicle is moved.

Trucks of this character are well known on the market but may require slight changes for better adaptation to my purposes, one of the principal changes probably being that the range through which the jaws may be lowered and raised should be somewhat increased.

The hot house itself, indicated at 3, is arranged in such a manner that it provides a plurality of pairs of parallel runners 4 which preferably extend through the entire hot house, allowing for cross walks if the hot house is so long that cross walks are required. The runners of each pair are spaced sufficiently to form a convenient support for a long line of boxes but the spacing is somewhat less than the width of the boxes so that the sides of the boxes project over the rails as shown at 5. The pairs of runners are spaced sufficiently to allow an attendant to comfortably walk between the lines of boxes for attending to the flowers and for cutting the same. The walks 6 are preferably made of concrete terminating in upright flanges 7, serving as supports for wooden rails 8, the flanges and rails forming the runners for the boxes.

It is essential in the use of my method that the watering and spraying system, as well as the heating means for the hot house, are arranged in such a manner as not to interfere with the free movement of the box manipulating trucks. The discharge pipes and valves 9 which are supported over the boxes are suspended from pipes 10, which latter are hinged to horizontal feeders 11, in such a manner that the discharge pipes may be swung from their active position shown in full lines in Figure 3, to an inactive position shown in dotted lines in the same figure so as to practically clear the entire space above the boxes.

For heating the hot house I preferably use steam heat, the steam being introduced through main pipes 12 accommodated in concrete channels 13 running underneath the walks and the boxes and the branch pipes 14 running along side of the runners underneath the boxes when the latter are in place. The main pipes 12 are preferably supported on cross rods 15 extending through the channels 13 in spaced relation to the floor thereof, and the connection between the main pipes 12 and the branch pipes 14 is preferably such, as illustrated in Figure 2, as to allow of expansion of the long branch pipes and the main pipes. The boxes themselves are preferably provided with suitable brackets 16 in the corners thereof, which serve as supporting means for posts 17 to which the plant supports previously referred to may be attached.

For ventilating the hot house I preferably use swingable windows 19 along the center line of the roof and swingable windows 20 below the eaves of the roof. The latter are actuated for swinging outwardly by a common shaft 21 adapted to operate on the windows through arms 22 and links 23.

To allow the trucks to freely enter and leave the hot house, suitable doors 18 are provided in the end of the hot house and are arranged in such a manner that an opening may be made in alignment with each pair of runners.

My method is carried out in the following manner, illustrated in Figure 3. The small plants are planted in the boxes outdoors in permanent places, and the boxes remain outdoors until the plants have substantially finished their growing period. Thereupon the boxes are successively picked up by the truck 2 previously referred to, and are conveyed while suspended from the truck into the hot house, the truck straddling a pair of runners and successively placing the boxes on the runners in longitudinally adjacent relation. The trucks may move about freely in straddling relation to the runners in view of the fact that the steam pipes are arranged so as not to interfere with the movements and the water pipes may be swung out of the way to give sufficient overhead clearance. The boxes now spend the blossoming, cutting or forcing period in the hot house, and after this period has passed they may be removed outside again to await a new blossoming period in the case of perennial flowers, or to allow of the planting of new small plants in the case of seasonal flowers. Each box may be manipulated individually without disturbing any of the other boxes, and it is perfectly feasible for the truck to take out an individual box from a long line of boxes and to convey the same to the exit end of the hot house without disturbing the intervening boxes, so that each box may be removed, irrespective of the status of the other boxes as soon as the cutting period for the flowers of that individual box has ceased.

The same truck may, of course, be used where desirable, for picking up and unloading special type boxes with drop bottoms, drop sides, etc. for bringing soils, fertilizers, pots and general equipment necessary during the forcing period from the outside into the hot house and for delivering the same at any spot desired.

The truck may also be used for taking the finished product, such as pot plants, from the hot house directly to the packers table in the packing room, without disturbing any of the rest of the flowers, etc. in the hot house.

I claim:

1. In combination, a hot house having a plurality of plant containing boxes arranged therein in aligned and elevated relation and with clearance on both sides and a box straddling vehicle having means for raising and lowering individual boxes and for transferring the same.

2. A hot house of the character described having a plurality of boxes arranged in aligned relation and a watering and spraying system supported over the boxes, parts of the system being movable between active and inactive positions so as to allow the space over the boxes to be cleared for giving access to a box manipulating vehicle.

3. A hot house of the character described having a plurality of boxes arranged in aligned relation and heating pipes arranged alongside of the boxes for regulating the temperature of the hot house, the heating pipes being arranged relative to the boxes so as to allow a box manipulating vehicle to straddle the boxes for placing or removing the same.

4. A hot house of the character described having parallel series of boxes arranged in aligned relation with clearance on each side of each series for admission of a box straddling vehicle and movable doors arranged relative to each series of boxes to allow of free access of the vehicle to each series from the outside when the door is open.

5. In a hot house of the character described, a plurality of boxes arranged in aligned relation and having runners supporting the same and unobstructed ways on opposite sides of the runners arranged to allow a box straddling vehicle access to the boxes.

6. In a hot house of the character described, a plurality of boxes arranged in aligned relation and having runners supporting the same and unobstructed ways on opposite sides of the runners arranged to allow a box straddling vehicle access to the boxes, the boxes being proportioned to project beyond the runners on opposite sides to facilitate manipulation of the boxes by the vehicle.

7. In a hot house of the character described, a plurality of boxes arranged in aligned relation and having runners supporting the same and unobstructed ways on opposite sides of the runners arranged to allow a box straddling vehicle access to the boxes, the hot house being constructed to give the vehicle free linear access to the ways.

8. In combination, a hot house having a plurality of plant containing boxes arranged therein in aligned relation and with clearance on both sides and a box straddling vehicle having means for raising and lowering individual boxes and for transferring the same.

RODERICK I. McLELLAN.